United States Patent [19]

McDonald et al.

[11] Patent Number: 4,952,324

[45] Date of Patent: * Aug. 28, 1990

[54] BOILER WATER TREATMENT

[75] Inventors: Alexander C. McDonald, The Woodlands; James L. Soos, Conroe, both of Tex.

[73] Assignee: Betz Laboratories, Inc., Trevose, Pa.

[ * ] Notice: The portion of the term of this patent subsequent to May 9, 2006 has been disclaimed.

[21] Appl. No.: 313,578

[22] Filed: Feb. 21, 1989

Related U.S. Application Data

[63] Continuation-in-part of Ser. No. 168,288, Mar. 15, 1988, Pat. No. 4,828,713.

[51] Int. Cl.$^5$ ............................................. C02F 5/14
[52] U.S. Cl. ................................... 210/697; 210/701; 252/180; 252/181
[58] Field of Search ........................... 210/697–701; 252/180, 181

[56] References Cited

U.S. PATENT DOCUMENTS

| | | | |
|---|---|---|---|
| 3,578,589 | 5/1971 | Hwa et al. | 422/15 |
| 3,630,937 | 12/1971 | Baum et al. | 252/181 |
| 3,837,803 | 9/1974 | Carter et al. | 252/181 |
| 4,131,562 | 12/1978 | Lutz et al. | 252/186 |
| 4,288,327 | 9/1981 | Godlewski et al. | 210/698 |
| 4,326,980 | 4/1982 | Snyder et al. | 210/701 |
| 4,442,009 | 4/1984 | O'Leary et al. | 210/701 |
| 4,530,766 | 7/1985 | Hann et al. | 210/701 |
| 4,589,985 | 5/1986 | Yorke | 210/699 |
| 4,640,793 | 2/1987 | Persinski et al. | 210/701 |
| 4,659,481 | 4/1987 | Chen | 210/701 |
| 4,671,888 | 6/1987 | Yorke | 252/180 |
| 4,828,713 | 5/1989 | McDonald et al. | 210/701 |

FOREIGN PATENT DOCUMENTS

| | | | |
|---|---|---|---|
| 7506874 | 12/1975 | Netherlands | 210/698 |
| 1414918 | 11/1975 | United Kingdom | 210/701 |
| 1519512 | 7/1978 | United Kingdom . | |

OTHER PUBLICATIONS

"Betz Handbook of Industrial Water Treatment", 8th ed., 1980, Betz Laboratories, Inc., Trevose, PA, pp. 89–96.

Primary Examiner—Peter Hruskoci
Attorney, Agent, or Firm—Steven D. Boyd; Alexander D. Ricci

[57] ABSTRACT

A method for treatment of boiler waters is disclosed. The method comprises a synergetic combination of ametacrylic acid-containing polymer with a strongly interacting nonionic surfactant, together with a chelant and/or a phosphate-generating species. The method is particularly effective when the surfactant is an alkoxylated alkylphenol or an alkoxylated alkylphenol ether.

34 Claims, 1 Drawing Sheet

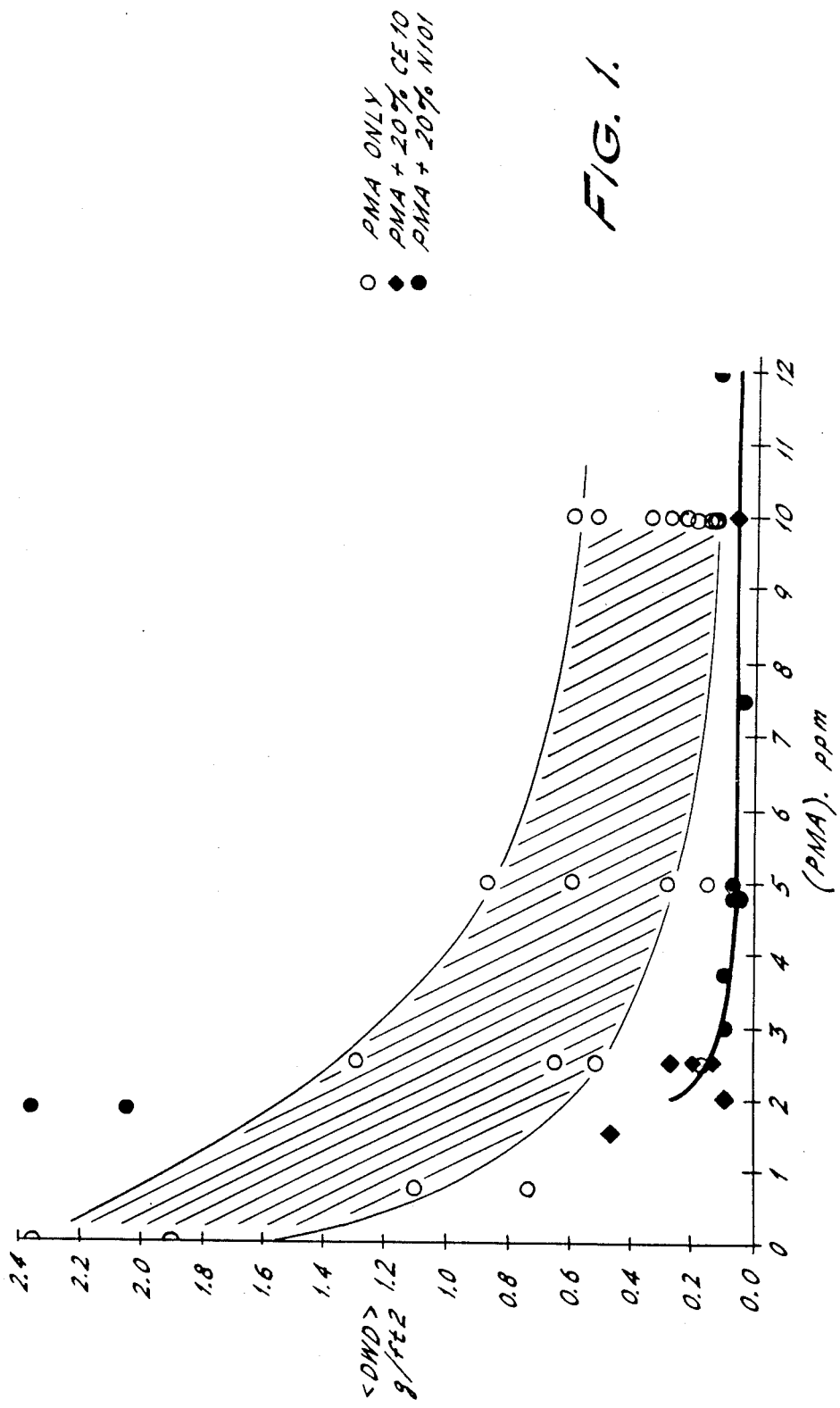

BOILER WATER TREATMENT

This is a continuation-in-part of Ser. No. 168,288 filed Mar. 15, 1988, now Pat. No. 4,828,713.

FIELD OF THE INVENTION

The present invention pertains to the treatment of boiler water systems with methacrylic acid-containing deposit control agents, and the synergetic enhancement of the activity thereof by surfactants, when the polymers and surfactants are used in conjunction with chelant-type molecules.

BACKGROUND OF THE INVENTION

As described comprehensively in U.S. Pat. No. 4,288,327 the deposition of solids onto heat transfer surfaces of steam generating equipment is a major problem. Common contaminants in boiler feedwater that can form deposits are calcium and magnesium salts (hardness), carbonate salts, sulfite, phosphate, siliceous matter, and iron oxides. Any foreign matter introduced into the boiler in soluble or particulate form will tend to form deposits on the heat transfer surfaces. Formation of deposits on the heat transfer surfaces will decrease the efficiency under which the heat transfer takes place, and can lead to overheating, circulation restrictions, damage to the systems, loss of effectiveness, and increased costs due to cleaning, unscheduled outages, and replacement of equipment. In an extreme case, catastrophic tube failure can occur.

Deposit control agents are frequently added to the feedwaters of boilers. Their ultimate objective is to inhibit the formation of deposits on the heat transfer surfaces and to facilitate the removal of any deposits in the blowdown. This is accomplished via two mechanisms: a solubilization mechanism, where chelants, or chelant-type molecules, form soluble complexes with the deposit-forming species which are removed in the blowdown; and, an adsorption mechanism, where the deposit control agent adsorbs on the surface of the particulate matter and either inhibits the formation of the deposit, or disperses the deposit that is being formed, and makes it more easily removable.

Phosphates, chelants and polymeric dispersants are frequently used in various combinations in boiler treatment programs. The phosphate is used to precipitate hardness or iron species; the chelants have the ability to complex and prevent the deposition of many cations under boiler water conditions. In higher pressure boilers, phosphate is also used for pH control, and since it maintains the system at a pH where corrosion is minimized, it also acts as a corrosion inhibitor. Polymers are used to disperse particulate matter, either the precipitates formed with phosphate treatment, or solid or colloidal matter already present. To some extent, polymers can also act as chelants to solubilize cations.

Polymers that have been used in boiler water treatment include naturally occurring products such as lignosulfonic acids and carboxymethylcelluloses. Synthetic anionic polymers are the more preferred materials recently, and include carboxylated polymers, sulphonated polymers, and polyphosphonic acids. Copolymers incorporating combinations of the above functionalities are also used. Examples of effective synthetic polymers are polyacrylic or polymethacrylic acids and copolymers of the two monomers, sulfonated styrene, polymaleic acid or anhydride, copolymers of sulfonated styrene and maleic anhydride, and others. Nonionic polymers do not appear to be effective dispersants in boiler water treatment.

In the use of polymeric dispersants, the polymers are fed to maintain a bulk concentration, which is many times higher than the effective amount of polymer needed for adsorption on the surfaces of the particulate matter or the heat transfer surface, and for chelation of hardness, etc. That is, the concentration of polymer on the surface is not only determined by the affinity of the polymer for the surface, but also by the equilibrium between the adsorbed species and the bulk species. Thus, where a treatment program might utilize 50–100 ppm of the polymeric dispersant, only 1–10 ppm of active species might be necessary if the polymer could more effectively be brought in contact with the surfaces in question. The excess dispersant can itself contribute to the impurities in the boiler and in the steam produced. Dispersants can degrade under boiler conditions, leading to organic materials, such as organic acids, which can be present in the steam. Thus, steam purity can be adversely affected by the polymeric dispersant. Furthermore, the organic acids can lead to corrosion in the boiler and in the areas contacted by the steam.

In many boiler designs, heat fluxes are not uniform throughout the entire unit due to design miscalculations. It is known that deposit weight densities (a measure of amount of boiler deposition) increase as heat fluxes increase, approximately as the square of the heat flux. This non-uniformity in heat transfer can lead to "hot spots" in a boiler where the heat flux can be as much as five times the average heat flux. These hot spots are predisposed to failure. It is often the case that in an effectively treated boiler there will still be many tube failures in these areas of high heat flux.

The Industry is therefore always looking for better ways and methods to enhance the effectiveness of polymeric dispersant treatment in boiler systems. What is particularly needed is a means to improve the effectiveness of polymeric dispersants under high heat flux boiler conditions, and under severe service conditions in a boiler, with the concurrent production of higher purity steam, and reduced organic loading in the boiler as well as in the steam produced.

BRIEF DESCRIPTION OF THE DRAWINGS

FIG. 1 shows the relationship of deposit weight sensity (DWD) and the treatment feed rate in parts per million (ppm).

GENERAL DESCRIPTION OF THE INVENTION

The present inventors discovered that certain nonionic surfactants form synergetic combinations with certain polymeric dispersants, when used together with chelants and/or phosphates, for boiler water treatment. It is believed that the use of chelants and/or phosphate-polymer combinations allow the polymer to be more effectively adsorbed onto the surfaces of particulate matter or heat transfer surfaces in a boiler.

It is therefore an object of the invention to provide a synergetic combination of a methacrylic acid-containing polymer and a nonionic surfactant with enhanced activity in boiler water treatment compared to the activity of the polymer without nonionic surfactant. "Synergetic" in the context of the present description is defined to mean a combination of materials which have better activity than one component alone, where the other component has little or no activity itself.

It is a further object of this invention to provide a combination of methacrylic acid-containing polymer and nonionic surfactant which in the presence of chelants and/or phosphates is more effective than the methacrylic acid-containing polymer alone in combination with said chelants or phosphates in boiler water treatment.

It is still a further object of this invention to provide a combination of methacrylic acid-containing polymer and nonionic surfactant which, when used in the presence of chelants and/or phosphates, allows boiler water treatment at significantly lower (methacrylic acid-containing polymer plus nonionic surfactant) dosages than methacrylic acid-containing polymer dosage alone.

It is another object of this invention to provide a combination of methacrylic acid-containing polymer and nonionic surfactant which when used in conjunction with chelants and/or phosphates is more effective than the methacrylic acid-containing polymer with chelants and/or phosphates under high heat flux boiler conditions.

It is another object of this invention to provide a boiler water treatment which can produce higher purity steam and which can reduce the organic loading in a boiler water system, and which can increase the amount of impurities removed from a boiler water system in the blowdown.

It is another object of this invention to provide a combination of methacrylic acid-containing polymer and nonionic surfactant which when used in conjunction with chelants and/or phosphates and other boiler additives such as amines, oxygen scavengers, and the like, is more effective than the methacrylic acid-containing polymer alone when used in conjunction with the chelants and/or phosphates and/or other boiler additives.

It is another object of this invention to provide a combination of methacrylic acid-containing polymer and nonionic surfactant which when used in conjunction with chelants and/or phosphates renders an ineffective methacrylic acid-containing polymer effective for boiler water treatment.

It is yet a further object of this invention to provide a combination of methacrylic acid-containing polymer and nonionic surfactant for boiler water treatment where the polymer and surfactant interact to form a more hydrophobic species, the nature of the interaction as defined hereinbelow.

It is another object of this invention to provide a boiler water treatment which can reduce the cost of boiler water treatment without reducing the effectiveness of the boiler water treatment.

Generally the above objectives are achieved through the use of a method utilizing the materials identified. The method is directed to the control of the formation and deposition of materials on the structural parts of steam generating systems, containing an aqueous system. The materials are those which are either present generally as particulate matter in the aqueous system, and/or those which are formed by the interaction and/or reaction of ions formed or contained in the aqueous system.

The method comprises adding a sufficient amount of polymers containing methacrylic acid or soluble salts thereof, a nonionic surfactant meeting specific criteria (both described later herein), chelants and/or phosphates.

The effective polymers and surfactants in accordance with the invention are those which meet the standards of the *Interaction Test* described later herein.

DESCRIPTION OF THE PRIOR ART

Hwa, et. al., U.S. Pat. No. 3,578,589, disclose the use of nonionic surfactants together with water soluble polymers for treatment of cooling water systems. This patent does not suggest, nor would it be expected, that the treatment disclosed would be effective under the vastly different conditions experienced in boiler waters: moderate temperatures and atmospheric pressure conditions in a cooling system as compared to high temperatures and pressures in a boiler system; lower dielectric constant of water in a boiler compared to a cooling system, which makes the properties of water significantly different; different principles of operation of a boiler compared to a cooling system, where in a boiler nucleation of gas (steam) occurs at the heat transfer surface, compared to an evaporative mechanism in a cooling system; single phase flow in a cooling system compared to two phase flow conditions in a boiler.

Furthermore, a wide range of nonionic surfactants was found effective in the Hwa patent, whereas in the present invention, only those nonionic surfactants which interact (as defined hereinbelow), with the polymer, are effective. Many of the Hwa nonionic surfactants are ineffective when practiced in accordance with the present invention.

In addition, polyacrylic or polymethacrylic acids or their salts were found effective in the Hwa patent, whereas it has been unexpectedly found that only methacrylic acid-containing polymers in combination with the particular nonionic surfactants described were discovered to be effective.

In addition, the effective ratio of polymer to surfactant disclosed in the Hwa patent for cooling water treatment is significantly broader than the unexpected range as determined for the present boiler water treatment. In fact, the preferred range disclosed in Hwa is completely ineffective under the conditions contemplated for boiler water treatment of the present process. The preferred conditions taught in the Hwa patent would lead one skilled in the art away from the preferred conditions as defined by the present inventive process. Indeed, six of the eight examples cited in Hwa have significantly greater surfactant to polymer concentrations, whereas in accordance with the claimed invention the optimum effective range of treatment has significantly greater polymer to surfactant ratios, just the reverse of the Hwa preferred ratios. Indeed, the present Inventors' preferred combination of methacrylic acid-containing polymer and nonionic surfactant unexpectedly is not effective at the Hwa preferred ratios. This will be demonstrated hereinafter.

In addition, the Hwa patent makes no suggestion of an interaction between polymer and surfactant, synergetic or otherwise. In fact, Hwa discloses only one data point, from which one is able to deduce that there is no synergetic interaction. The surfactant alone shows approximately the same activity as the polymer under the conditions disclosed in Hwa, whereas under boiler water conditions it was found that the preferred nonionic surfactants are ineffective.

British Patent 1,519,512 teaches use of maleic anhydride polymers combined with nonionic or anionic surfactants for inhibiting deposition in evaporators, such as in sea water desalination applications. These types of applications are very similar to cooling applications, and again are vastly different from treatment of boiler waters. Furthermore, the British patent contemplates the specific use of maleic anhydride polymers, whereas the present invention requires methacrylic acid-containing polymers. In addition, whereas nonionic or anionic surfactants are specified as effective in the British patent, the present inventors have found that in general anionic surfactants do not provide the interaction with the methacrylic acid-containing polymers and are thus ineffective. The British patent is therefore not considered to be relevant to the present invention as claimed.

Baum, et. al., U.S. Pat. No. 3,630,937 disclose the use for boiler water treatment of sulfonated polystyrene combined with a chelating agent, and optionally, an antifoaming agent. Antifoam agents can be surfactants. Use of phosphates and silicates is also taught, but not in conjunction with an antifoam agent. The antifoam agent is used up to about a 10:1 ratio of antifoaming agent to polystyrene sulfonate.

The teachings of this patent are not considered relevant to the present invention because it would not be expected that a methacrylic acid-containing polymer could be substituted for the sulfonated polystyrene, nor would the ratios of antifoaming agent to polymer taught in the Baum patent be effective in the present inventive process. Moreover, one of the preferred nonionic surfactants of this invention is frequently used as a foaming agent, as opposed to an antifoaming agent.

Furthermore, the only antifoam agent mentioned in Baum is a polypropylene glycol (col.3, lines 33-34). A similar material, an ethylene glycol-propylene glycol butyl ether copolymer, was ineffective in our invention. Thus there is no suggestion or teaching in Baum that the combination of methacrylic acid-containing polymer and nonionic surfactant described and claimed would provide a superior boiler water treatment.

Yorke, U.S. Pat. No. 4,589,985 and 4,671,888, teach the use of anionic polyelectrolytes and anionic surfactants to control alkaline earth metal scales in aqueous systems. The preferred anionic polyelectrolytes contain 2-acrylamido-2-methylpropyl sulfonic acid, or 2-methacrylamido-2-methylpropyl sulfonic acid or their salts. The patent requires the use of anionic surfactants. No suggestion whatever that a nonionic surfactant would be useful is made. Furthermore, reference to cooling water applications only are made ('985, cols. 3 and 4, lines 68 and 1-3, respectively; and '888, column 4, lines 3-6).

DETAILED DESCRIPTION OF THE INVENTION

The present invention is directed to a composition or combination for use in boiler water treatment. The composition comprises certain nonionic surfactants, in combination with a methacrylic acid-containing polymer, together with a chelant and/or phosphate. It was discovered that the surfactant enhances the effectiveness of the methacrylic acid-containing polymer, when used with the other recited treating agents.

POLYMERIC DISPERSANT

The methacrylic acid-containing polymer can be a homopolymer of methacrylic acid or methacrylic anhydride (the anhydride would hydrolyze in water to give methacrylic acid moieties), copolymers of methacrylic acid, and water-soluble salts thereof (e.g., sodium, potassium, ammonium and the like). Effective copolymers are methacrylic acid with acrylic acid, maleic acid or anhydride, itaconic acid, sulfonated styrene, acrylamide, 2-acrylamido-2-methylpropane sulfonic acid, 3-allyloxy-2-hydroxypropane sulfonic acid, and the like. It is to be understood that water-soluble salts of the monomers are also included within the purview of the invention.

The polymers or copolymers can be prepared by random, block, alternating, or other polymerization techniques, which techniques are well known.

The ratio of monomers in the copolymers is not significant, as long as there is a detectable amount of methacrylic acid in the copolymer. By most commonly used analytical techniques, this will be a minimum of about five (5) mole percent of methacrylic acid in the polymer. For the present purposes a carbon-13 nuclear magnetic resonance technique was used to detect the presence of methacrylic acid in the copolymers.

Preferred are homopolymers of methacrylic acid and copolymers of methacrylic acid and acrylic acid, and water soluble salts thereof, containing up to about 20 mole per cent of acrylic acid.

Molecular weight is not considered critical to the practice of the invention, as long as the polymer is water soluble. The molecular weight of the methacrylic acid-containing polymer can, however, be from about 500 to about 500,000, with a preferred range of about 500 to about 50,000. Molecular weights of the commercially available methacrylic acid-containing polymers useful for boiler water treatment tend to fall within the above range.

SURFACTANTS

The nonionic surfactants used in accordance with the invention are those which interact with the methacrylic acid-containing polymers, as defined hereinbelow. The broad class of nonionic surfactants is well known. A listing of nonionic surfactants can be found in "McCutcheon's Emulsifiers and Detergents", 1987 North American Edition, McCutcheon Division, MC Publishing Co., 175 Rock Road, Glen Rock, NJ 07452. The Hwa patent (U.S. Pat. No. 3,578,589) also contains an extensive list of nonionic surfactants, herein incorporated by reference. The preferred surfactants have the following structure:

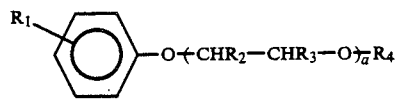

wherein $R_1$ is a straight or branched chain alkyl group having from about 4 to about 20 carbon atoms; $R_2$ and $R_3$ are independently hydrogen or methyl; $R_4$ is hydrogen, alkyl, aryl, or aralkyl, the alkyl portion of said aralkyl group being a straight or branched chain having from about 1 to about 20 carbon atoms, and the aryl portion of said aralkyl group being substituted benzene or naphthalene; and a is from about 0 to about 50. Our most preferred nonionic surfactants are the alkoxylated alkyl phenols and alkoxylated alkyl phenol ethers. Most preferred for our invention are commercial materials such as the homologous series of alkoxylated octyl or nonyl phenols, sold by Rohm and Haas under the Triton label. Typical of the preferred surfactants are the Triton X- and N- series, which are alkoxylated t-octyl and nonyl phenols, respectively, containing from about 4 moles of ethylene and/or propylene oxide up to about 50 moles of ethylene and/or propylene oxide. Also preferred are the surfactants represented by the Rohm and Haas CF- series, which are ethoxylated and ethoxylated/propoxylated t-octyl phenolic ethers containing from about 5 to about 20 moles of ethylene and propylene oxide. Most preferred are nonyl phenol reacted with ten (10) moles of ethylene oxide, represented by Rohm and Haas Triton N-101, and t-octyl phenol reacted with ten (10) moles of ethylene oxide and capped with a benzyl ether group, represented by Rohm and Haas Triton CF-10. Other nonionic surfactants, in which other alkyl groups attached to the phenol, are also effective. Critical is the interaction of the nonionic surfactant with the methacrylic acid containing-polymer, as later described.

The relative amounts of methacrylic acid-containing polymer to nonionic surfactant can be from a weight ratio of about 10:1 to about 1:10, with a preferred weight ratio of polymer to surfactant of about 1:1 to about 10:1. Most preferred is a weight ratio of polymer to surfactant of about 5:1.

The methacrylic acid-containing polymer combined with the non-ionic surfactant can be applied in a boiler water treatment program over a wide range of dosages, anywhere from about 0.1 ppm to about 500 ppm. We prefer a total polymer/surfactant dosage of about 0.5 ppm to about 50 ppm.

CHELANTS

Chelants that are useful in combination with the methacrylic acid-containing polymers and nonionic surfactants can be any of the chelants commonly used in boiler water treatment. Included are ethylenediaminetetraacetic acid and its water soluble salts (EDTA), nitrilotriacetic acid and its water soluble salts (NTA), hydroxyethylethylenediaminetriacetic acid (HEEDTA) and its water soluble salts, and the like.

The dosage of chelant is usually determined by the amount of hardness and other chelatable species present in the boiler feedwater. The chelant can be fed at from about 30% of the "demand" to several hundred times the chelatable species demand. Specific dosages are determined by the conditions existing in the particular boiler system. It is to be understood that our invention is not limited by the dosage of chelant. Commonly used dosages are 0.3 to 3 parts per part of chelatable species.

The phosphate species used in conjunction with the polymer/surfactant and chelant can be any inorganic water soluble phosphate salt, such as mono-, di-, and trisodium phosphate, sodium hexametaphosphate, sodium tripolyphosphate, tetrapotassium pyrophosphate, and the like. It is to be understood that the cation can be any water soluble species. Other phosphorous-containing species can be any organic phosphorous-containing species which would lead to orthophosphate under boiler water conditions. Typical of the organic phosphorous-containing species would be the organic phosphonic acids and their water soluble salts, such as hydroxyethylidenediphosphonic acid, nitrilotris(methylenephosphonic acid), and the like. The kinds of organic phosphonic acids that would be useful can be found, e.g., in Carter et.al., U.S. Pat. No. 3,837,803, herein incorporated by reference. It is to be understood that other organic phosphorous-containing compounds and their water soluble salts are also useful in our invention.

The dosage of phosphorous-containing species will depend on the pH desired in the system, and the levels of hardness present. It is to be understood that our invention is not limited by the dosage of phosphorous-containing species.

The use of polymer, chelants and phosphates, alone and in combination, for boiler water treatment is discussed in the "Betz Handbook of Industrial Water Treatment", Eighth Edition, 1980, Betz Laboratories, Inc., Trevose, Pa. 19047, pages 89–96, herein incorporated by reference.

The invention can be applied in a boiler water treatment program with many other commonly used materials. These can include, but are not limited to: neutralizing or filming amines; oxygen scavengers; tracer chemicals such as molybdate; antifoaming agents; corrosion inhibitors, such as nitrates; and the like. The Handbook referred to above provides discussion relative to these materials.

The inventive treatment program can be applied for boiler water treatment in much the same way that conventional boiler water treatments are applied. Thus, the treatment can be applied in the boiler feedwater, or to the boiler directly. The components of the treatment can be fed as a single, formulated product, or they can be fed individually, or any combination of single and formulated product.

The inventive treatment is not affected by the pH of the system, and will be effective at any boiler pH's that are used in the industry.

It has been determined that, for a given dosage of methacrylic acid-containing polymer, addition of a nonionic surfactant in conjunction with chelants and/or phosphates, unexpectedly increases the effectiveness of the polymer, such that the percent of deposit inhibition increases at the same polymer dosage. In addition, we have found that the addition of the nonionic surfactant unexpectedly allows a significant reduction in the dosage of polymer, while maintaining the same deposit control effectiveness as at the higher polymer dosages. In addition, the inventors found that the nonionic surfactant unexpectedly enhances the performance of off-grade methacrylic acid-containing polymer, such that a polymer which is ineffective and would normally be rejected from use, becomes effective and useful with the addition of the surfactant.

The invention is further illustrated by the following specific, but not limiting, examples, tables and the figure.

FIG. 1 will be described in the context of the Example.

EXAMPLES

The dispersion and deposit inhibition effectiveness of the polymers and polymer/surfactant combinations were determined using 8 kW model steam generators fired with electric heated probes. Soluble salts of calcium, magnesium, iron, etc, and the internal treatment chemicals including polymer, surfactant and chelant were added to the feedwater prior to entering the steam generators. Small amounts of caustic and/or acid were also added to the feed water to maintain the boiler water pH. The steaming and blowdown rate were maintained at constant rates to achieve the required number of cycles of operation. A typical experiment consisted of operating a model steam generator for 44 hours while maintaining the pressure, cycles of operation, and feedwater concentrations of dissolved solids and treatment chemicals at their desired levels. After 44 hours, the weight and composition of all the deposit formed on the electric probes was determined either by dissolution in acid and subsequent chemical analysis, or by scraping and mechanical weighing.

The data shown below were obtained in research boilers, where the length of the experiment is usually less than the time that a typical industrial boiler is operated between shutdowns.

It is thus to be understood that the deposits found in typical industrial boilers can be many times the magnitude of deposits generated in a research boiler experiment, and that the improvements achieved by the present invention could be even more dramatic in an operating boiler.

FIG. 1 dramatically demonstrates the effect of the nonionic surfactants when used in combination with methacrylic acid-containing polymers. The data were gathered using a polymer/chelant boiler program. It can be seen that at 10 ppm of polymer, for example, the deposit weight densities (DWD), a measure of deposit control efficacy, on the probes, i.e., the heat transfer surfaces, for a 5:1 by weight ratio of polymer/surfactant for two of the preferred surfactants clearly provide better deposit control than 10 ppm of the polymer alone.

It is apparent that the total dosage of polymer plus surfactant can be significantly reduced below the dosage of polymer alone, while still maintaining effective deposit control. For example, a total dosage of polymer/surfactant in FIG. 1 of about 4 ppm still provides enhanced efficacy over the polymer dosage of 10 ppm. Thus, the organic loading in the boiler blowdown and in the steam would be significantly reduced. It is also evident that the polymer effectiveness alone does not maintain itself as the polymer dosage decreases.

In Table I, the efficacy in a polymer chelant program of strongly interacting surfactants (those with a weight ratio of greater than ten (10) in the "interaction test") is compared with that of poorly interacting surfactants (those with a weight ratio of less than 10 in the interaction test). Entries 1, 2, and 3 are tests with surfactants which interact strongly with the polymer, while entries 4, 5, and 6 represent tests with poorly interacting surfactants. Entry 4 is a test with an anionic surfactant, and demonstrates that only nonionic surfactants are effective in our invention. The differences in efficacy show that only strongly interacting nonionic surfactants enhance the efficacy of methacrylic acid-containing polymers.

Entry 7 in Table I shows that the surfactant alone has poor deposit control activity.

Entries 8, 9, and 10 are tests at high heat fluxes, and show that the polymer/surfactant combination is more efficacious than the polymer alone, which still demonstrates effective performance by itself.

Entries 11 and 12 show that the polymer/surfactant combination is effective over a broad range of polymer/surfactant ratios, while entry 13 shows that this effectiveness drops off above a ratio of polymer/surfactant of about 10.

INTERACTION TEST BETWEEN POLYMER AND SURFACTANT (INTERACTION TEST)

The test used to determine which nonionic surfactants interact strongly with the methacrylic acid-containing polymer is described below. Values of the ratio of final sodium chloride concentration for the polymer/surfactant to the final sodium chloride concentration for the surfactant alone above about 10 indicates a strong interaction between polymer and surfactant.

TEST PROCEDURE

The solubility of polymethacrylic acid (PMA) and surfactants in salt solutions was determined. Aliquots of aqueous solutions of 25 wt % PMA and 25 wt % surfactant were placed in a flask and titrated to a cloudy endpoint with a 20 wt % NaCl solution. The weight percent of NaCl in the final titrated solutions was then calculated. The strength of interaction between a given surfactant and PMA was estimated by the ratio of weight percent NaCl at the cloudy endpoint for the surfactant alone, versus equal amounts of the surfactant and PMA. A high value of this ratio indicates that the mixture of surfactant and PMA is less tolerant of NaCl than the surfactant alone, and that thus there is a strong interaction between polymer and surfactant. PMA by itself was soluble in 20 wt % NaCl and no cloudy endpoint was observed. Values of this ratio (wt % NaCl for surfactant + PMA : wt % NaCl for surfactant only) for the surfactants tested are summarized below. Values of the ratio above about 10 indicate a strong interaction between polymer and surfactant.

Tergitol NP9 > Triton CF10 > Triton CF76 > Triton CF21 >
(~38)        31.9        28.7        27
Triton X-100 > Triton N401 > Triton N101 > Tergitol 15-S-7 >
(>20)       (>20)       13.8       7.4
Triton CF-54 > Triton X-405 = Triton QS-44
1.46      (~1)      (~1)

TABLE I

METHACRYLIC ACID-CONTAINING POLYMER/NONIONIC SURFACTANT IN A POLYMER/CHELANT PROGRAM
Feedwater: 4 ppm Ca, 1 ppm Mg, 1 ppm Fe,
EDTA fed as chelant at 74% of demand
900 psig pressure, 15 cycles

|     | Polymer | ppm | Surfactant | ppm | Flux W/in$^2$ | DWD g/ft$^2$ | % Deposit Inhibition |
| --- | --- | --- | --- | --- | --- | --- | --- |
| 1.  | PMA | 2.5  | Triton CF10 | 0.5 | 376 | 0.47 | 80 |
| 2.  | PMA | 2.5  | Triton N101 | 0.5 | 376 | 0.09 | 96 |
| 3.  | PMA | 2.5  | Triton CF76 | 0.5 | 376 | 0.20 | 91 |
| 4.  | PMA | 2.5  | Triton QS44 | 0.5 | 376 | 1.51 | 35 |
| 5.  | PMA | 2.5  | Triton CF54 | 0.5 | 376 | 1.80 | 22 |
| 6.  | PMA | 2.5  | Triton X405 | 0.5 | 376 | 1.76 | 23 |
| 7.  | —   | —    | Triton N101 | 0.5 | 376 | 0.93 | 60 |
| 8.  | —   | —    | —           | —   | 610 | 5.48 | 0  |
| 9.  | PMA | 10.0 | —           | —   | 610 | 0.72 | 87 |
| 10. | PMA | 10.0 | Triton N101 | 2.0 | 610 | 0.12 | 98 |
| 11. | PMA | 2.5  | Triton N101 | 1.2 | 376 | 0.10 | 96 |

TABLE I-continued

METHACRYLIC ACID-CONTAINING POLYMER/NONIONIC SURFACTANT IN A POLYMER/CHELANT PROGRAM

Feedwater: 4 ppm Ca, 1 ppm Mg, 1 ppm Fe,
EDTA fed as chelant at 74% of demand
900 psig pressure, 15 cycles

| | Polymer | ppm | Surfactant | ppm | Flux W/in$^2$ | DWD g/ft$^2$ | % Deposit Inhibition |
|---|---|---|---|---|---|---|---|
| 12. | PMA | 2.5 | Triton N101 | 2.5 | 376 | 0.06 | 97 |
| 13. | PMA | 2.5 | Triton N101 | 0.2 | 376 | 0.48 | 79 |

Table II shows the effect of methacrylic acid-containing polymer in combination with a nonionic surfactant in a polymer/chelant/phosphate program. The polymer/surfactant combination at 6 ppm total dosage is clearly superior to the polymer alone in the range of 5 to 10 ppm.

Entries 2 through 8 were tests conducted with a commercially available polymaleic anhydride (MLA). In entries 6, 7, and 8, are shown the activity of the polymer alone. Entries 2–5, in which the polymer plus various preferred surfactants were tested, it can be seen that no synergetic performance was obtained.

TABLE II

PMA IN A POLYMER/CHELANT/PHOSPHATE PROGRAM

4 ppm Ca, 1 ppm Mg, 1 ppm Fe, 600 psig, 15 cyles
PO$_4$ and EDTA fed at 93% and 37% of demand, respectively

| Polymer | ppm | Surfactant | ppm | Chelant | % Demand | Pressure psig | Flux W/in$^2$ | DWD g/ft$^2$ | % Deposit Inhibition |
|---|---|---|---|---|---|---|---|---|---|
| — | — | — | — | EDTA + PO$_4$ | 130 | 600 | 376 | 1.59 | 0 |
| PMA | 10 | — | — | EDTA + PO$_4$ | 130 | 600 | 376 | 1.03 | 35 |
| PMA | 5 | — | — | EDTA + PO$_4$ | 130 | 600 | 376 | 1.04 | 35 |
| PMA | 5 | N101 (Triton) | 1 | EDTA + PO$_4$ | 130 | 600 | 376 | 0.69 | 57 |

In Table III, it is further demonstrated that not all nonionic surfactants are effective in our invention. Entry 1 is a test with a polyethylene glycol in a polymer/chelant program. The combination of polymer and surfactant shows poor activity. It is further shown in Table III that the addition of an antifoam agent, Ucon 5100 (a polyalkylene glycol) causes a deterioration of the activity of the synergetic polymer/surfactant.

Entries 9–11 represent tests that were run with polyacrylic acid, a commonly used boiler water deposit control agent. It is clear that the addition of surfactant not only does not provide synergetic activity, but the surfactant actually results in a deterioration of the activity of the polymer. For comparison purposes, entries 12 and 13 show the excellent performance of polymethacrylic acid with the same surfactant.

TABLE III

PMA + Surfactants in a Polymer/Chelant Program

4 ppm Ca, 1 ppm Mg, 1 ppm Fe, 15 cycles
900 psig pressure, 376 W/in$^2$ flux

| | [PMA] ppm | Surf | Conc ppm | AFS ppm | Chelant | % demand | DWD g/ft$^2$ | % Deposit Inhibition |
|---|---|---|---|---|---|---|---|---|
| 1. | 2.00 | PEG500 | 0.40 | 0.00 | EDTA | 74 | 2.310 | 0 |
| 2. | 2.52 | CF10 | 0.48 | 0.00 | EDTA | 74 | 0.190 | 92 |
| 3. | 2.50 | CF10 | 0.50 | 0.20 | EDTA | 74 | 0.760 | 67 |
| 4. | 2.50 | N101 | 0.50 | 0.00 | EDTA | 74 | 0.090 | 96 |
| 5. | 2.50 | N101 | 0.50 | 0.50 | EDTA | 74 | 1.040 | 55 |
| 6. | 2.50 | N101 | 0.50 | 2.00 | EDTA | 74 | 2.100 | 9 |

AFS = Ucon 5100

In Table IV, the activity of other polymeric deposit control agents which are commonly used in boiler water treatment is compared. Entry 1 is a test conducted with a methacrylic acid copolymer with acrylic acid, containing 90 mole % of methacrylic acid. In combination with a preferred surfactant, it demonstrates good performance.

Entries 14–16 show the results with another deposit control agent frequently used for boiler water treatment, a sulfonated styrene-maleic anhydride copolymer (SSMA). Negative results with a preferred surfactant similar to the results with polyacrylic acid, were obtained.

TABLE IV

Polymers and Surfactants in a Polymer/Chelant Program
4 ppm Ca, 1 ppm Mg, 1 ppm Fe, 15 cycles
900 psig pressure, 376 W/in² flux

| | Polymer | ppm | Surfactant | ppm | Chelant | Demand | DWD g/ft² | % Deposit Inhibition |
|---|---|---|---|---|---|---|---|---|
| 1. | MA/AA 9:1 | 2.5 | CF10 | 0.50 | EDTA | 74.00 | 0.23 | 90 |
| 2. | MLA | 1.5 | CF10 | 0.30 | EDTA | 74.00 | 1.30 | 43 |
| 3. | MLA | 1.5 | N57 | 0.30 | EDTA | 74.00 | 1.66 | 28 |
| 4. | MLA | 2.0 | CF10 | 1.30 | EDTA | 74.00 | 0.29 | 87 |
| 5. | MLA | 2.1 | N101 | 1.30 | EDTA | 74.00 | 1.62 | 30 |
| 6. | MLA | 2.5 | — | — | EDTA | 74.00 | 0.26 | 89 |
| 7. | MLA | 5.0 | — | — | EDTA | 74.00 | 0.20 | 91 |
| 8. | MLA | 10.0 | — | — | EDTA | 74.00 | 0.37 | 84 |
| 9. | PAA | 2.5 | CF10 | 0.50 | EDTA | 74.00 | 0.90 | 61 |
| 10. | PAA | 2.5 | — | — | EDTA | 74.00 | 0.44 | 81 |
| 11. | PAA | 10.0 | — | — | EDTA | 74.00 | 0.41 | 82 |
| 12. | PMA | 2.5 | CF10 | 0.50 | EDTA | 74.00 | 0.27 | 88 |
| 13. | PMA | 2.5 | CF10 | 0.50 | EDTA | 74.00 | 0.19 | 92 |
| 14. | SSMA | 2.5 | CF10 | 0.50 | EDTA | 74.00 | 1.78 | 23 |
| 15. | SSMA | 2.5 | — | — | EDTA | 74.00 | 0.86 | 63 |
| 16. | SSMA | 10.0 | — | — | EDTA | 74.00 | 0.94 | 59 |

In Table V, the ability of the polymer/surfactant combination to enhance the performance of off-grade polymer is demonstrated. The codes in the polymer column refer to production batch numbers. It is clear that substandard polymer which would normally have to be discarded, is made effective by the synergetic addition of nonionic surfactant.

TABLE V

"Substandard" PMA* + N101 in a 900 psig
Polymer/Chelant Program
4 ppm Ca, 1 ppm Mg, 1 ppm Fe, 15 cycles

| | Polymer | ppm | Surfactant | ppm | Chelant | % Demand | Flux W/in² | DWD g/ft² | % Deposit Inhibition |
|---|---|---|---|---|---|---|---|---|---|
| 1. | *6KD303595 | 10.0 | | | EDTA | 74 | 376 | 0.910 | 60 |
| 2. | *6KD303595 | 8.3 | N101 | 1.7 | EDTA | 74 | 376 | 0.130 | 94 |
| 3. | *6KH250210 | 10.0 | | | EDTA | 74 | 376 | 0.660 | 71 |
| 4. | *6KH250210 | 8.3 | N101 | 1.7 | EDTA | 74 | 376 | 0.100 | 96 |
| 5. | *6KJ023595 | 10.0 | | | EDTA | 74 | 376 | 0.820 | 64 |
| 6. | *6KJ023595 | 8.3 | N101 | 1.7 | EDTA | 74 | 376 | 0.390 | 83 |
| 7. | *6KL033595 | 10.0 | | | EDTA | 74 | 376 | 0.400 | 83 |
| 8. | *6KL033595 | 8.3 | N101 | 1.7 | EDTA | 74 | 376 | 0.090 | 96 |
| 9. | PMA** | 10.0 | | | EDTA | 74 | 376 | 0.090 | 96 |
| 10. | PMA** | 5.0 | | | EDTA | 74 | 376 | 0.865 | 62 |
| 11. | PMA** | 2.5 | | | EDTA | 74 | 376 | 1.300 | 43 |
| 12. | PMA** | 2.5 | | | EDTA | 74 | 376 | 1.630 | 29 |

**DWD for laboratory standard PMA shown for comparison

Tables VI and VII show the effect of methacrylic acid-containing polymer in combination with a nonionic surfactant in a polymer/phosphate program showing the polymer/surfactant combination effect with a phosphate and no "chelant".

TABLE VI

PMA IN A POLYMER/PHOSPHATE PROGRAM
10 ppm Ca, 5 ppm 7 g, 1 ppm Fe, PO₄ feed at 100% of demand,
600 psig, 15 cycles

| Polymer | ppm | Surfactant | ppm | Phosphate | % Demand | Flux w/in² | DWD g/ft² | % Deposit Inhibition |
|---|---|---|---|---|---|---|---|---|
| PMA | 20.0 | N101 | 4.0 | PO₄ | 100 | 376 | 0.680 | 91.3 |
| PMA | 20.0 | N101 | 2.0 | PO₄ | 100 | 376 | 2.050 | 73.9 |
| PMA | 20.0 | N101 | 10.0 | PO₄ | 100 | 376 | 1.720 | 78.1 |
| PMA | 17.0 | N101 | 3.0 | PO₄ | 100 | 376 | 0.850 | 89.2 |
| PMA | 15.0 | N101 | 5.0 | PO₄ | 100 | 376 | 1.060 | 86.5 |
| PMA | — | N101 | 10.0 | PO₄ | 100 | 376 | 9.770 | <0.0 |
| PMA | 16.5 | N101 | 3.5 | PO₄ | 100 | 376 | 0.3964 | 95.0 |
| PMA | 20.0 | N101 (Triton) | 0.0 | PO₄ | 100 | 376 | 1.210 | 84.6 |

TABLE VII

PMA IN A POLYMER/PHOSPHATE PROGRAM
5 ppm Fe, PO₄ feed at 100% of demand,
1450 psig, 15 cycles

| Polymer | ppm | Surfactant | ppm | Phosphate | % Demand | Flux w/in² | DWD g/ft² |
|---|---|---|---|---|---|---|---|
| PMA | 4.0 | N101 | 1.0 | PO₄ | 25 | 376 | 1.36 |
| PMA | 8.3 | N101 | 1.7 | PO₄ | 25 | 376 | 1.48 |

TABLE VII-continued

PMA IN A POLYMER/PHOSPHATE PROGRAM
5 ppm Fe, PO$_4$ feed at 100% of demand,
1450 psig, 15 cycles

| Polymer | ppm | Surfactant | ppm | Phosphate | % Demand | Flux w/in$^2$ | DWD g/ft$^2$ |
|---|---|---|---|---|---|---|---|
| | | (Triton) | | | | | |

Having thus described the invention what we claim is:

1. A method of controlling the formation and deposition of materials including soluble salts of calcium, magnesium and iron on the structural parts of a steam generating system containing an aqueous system, which materials would deposit and/or form and deposit under steam generating conditions, which method comprises introducing into said aqueous system a sufficient amount for the purpose of a dispersant comprised of a water soluble methacrylic acid-containing polymer containing from about 5 to 100 mole % of methacrylic acid, a chelant selected from the group ethylenediaminetetraacetic acid, nitrilotriacetic acid, hydroxyethylethylenediaminetetraacetic acid, and water soluble salts thereof and/or a water soluble phosphate generating compound, and a nonionic surfactant, wherein the amount of said chelant and/or said phosphate and said surfactant introduced synergetically enhances the dispersant activity of said polymer.

2. Method according to claim 1, wherein said methacrylic acid-containing polymer is a homopolymer of methacrylic acid.

3. Method according to claim 1, wherein said methacrylic acid-containing polymer is a copolymer of methacrylic acid and acrylic acid.

4. Method according to claim 3, wherein said copolymer contains from about 1 to about 25 mole % of acrylic acid.

5. Method according to claim 1, wherein said methacrylic acid-containing polymer is a copolymer of methacrylic acid and maleic anhydride.

6. Method according to claim 1, wherein said methacrylic acid-containing polymer is a copolymer of methacrylic acid and 2-acrylamido-2-methylpropanesulfonic acid.

7. Method according to claim 1, wherein said methacrylic acid-containing polymer is a copolymer of methacrylic acid and 3-allyloxy-2-hydroxypropanesulfonic acid.

8. Method according to claim 1, wherein said nonionic surfactant has the following structure;

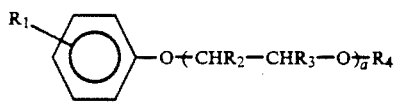

wherein $R_1$ is a straight or branched chain alkyl group having from about 4 to about 20 carbon atoms; $R_2$ and $R_3$ are independently hydrogen or methyl; $R_4$ is hydrogen, alkyl, aryl, or aralkyl, the alkyl portion being straight or branched chain having from about 1 to about 20 carbon atoms, and the aryl portion being substituted benzene or naphthalene; and a is from about 0 to about 50.

9. Method according to claim 8, wherein $R_1$ is octyl, and $R_4$ is hydrogen.

10. Method according to claim 8, wherein $R_1$ is nonyl, and $R_4$ is hydrogen.

11. Method according to claim 8, wherein $R_1$ is t-octyl, $R_2$, $R_3$, and $R_4$ are hydrogen, and a is about 4 to about 50.

12. Method according to claim 8, wherein $R_1$ is t-octyl, $R_2$, $R_3$, and $R_4$ are hydrogen, and a is about 10.

13. A method according to claim 8, wherein $R_1$ is nonyl, $R_2$, $R_3$, and $R_4$ are hydrogen, and a is about 4 to about 50.

14. Method according to claim 8, wherein said $R_1$ is nonyl, $R_2$, $R_3$, and $R_4$ are hydrogen, and a is about 10.

15. Method according to claim 8, wherein $R_1$ is t-octyl, $R_2$ and $R_3$ are hydrogen, $R_4$ is benzyl, and a is about 40 to about 50.

16. Method according to claim 8, wherein $R_1$ is t-octyl, $R_2$ and $R_3$ are hydrogen, $R_4$ is benzyl, and a is about 10.

17. Method according to claim 8, wherein $R_1$ is t-octyl, $R_2$ and $R_3$ are hydrogen, $R_4$ is t-butyl, and a is about 4 to about 50.

18. Method according to claim 8, wherein $R_1$ is t-octyl, $R_2$ and $R_3$ are hydrogen, $R_4$ is t-butyl, and a is about 26.

19. Method according to claim 8, wherein $R_1$ is t-octyl, $R_2$ and $R_3$ are independently hydrogen or methyl, $R_4$ is hydrogen, and a is about 4 to about 50.

20. Method according to claim 8, wherein $R_1$ is t-octyl, $R_2$ and $R_3$ are independently hydrogen or methyl, $R_4$ is hydrogen, and a is about 8.

21. Method according to claim 1, wherein said phosphate-generating compound is an inorganic phosphate salt.

22. Method according to claim 1, wherein the weight ratio of methacrylic acid-containing polymer to nonionic surfactant introduced into said aqueous system is about 10:1 to about 1:10.

23. Method according to claim 1, wherein the weight ratio of methacrylic acid-containing polymer to nonionic surfactant introduced into said aqueous system is about 1:1 to about 10:1.

24. Method according to claim 1, wherein the weight ratio of methacrylic acid-containing polymer to nonionic surfactant introduced into said aqueous system is about 5:1.

25. A method of controlling the formation deposition of materials including soluble salts of calcium, magnesium and iron on the structural part of a steam generating system containing an aqueous system, which materials would deposit and/or form and deposit under steam generating conditions, which method comprises introducing into said aqueous system a sufficient amount for the purpose of a dispersant comprised of a water soluble methacrylic acid-containing polymer containing from about 5 to 100 mole % of methacrylic acid, a chelant selected from the group ethylenediaminetetraacetic acid, nitrilotriacetic acid, hydroxyethylenediaminetetraacetic acid, and water soluble salts thereof and/or a water soluble phosphate generating compound, and a nonionic surfactant, wherein the amount of said chelant and/or said phosphate and said surfactant introduced synergetically enhances the dispersant activity of said polymer, and wherein the combination of said polymer and said surfactant used is determined by an interaction test, which measures the strength of interaction between said polymer and said surfactant.

26. Method according to claim 25, wherein said methacrylic acid-containing polymer is a homopolymer of methacrylic acid.

27. Method according to claim 25, wherein said methacrylic acid-containing polymer is a copolymer of methacrylic acid and acrylic acid.

28. Method according to claim 27, wherein said copolymer contains from about 1 to about 25 mole % of acrylic acid.

29. Method according to claim 25, wherein said methacrylic acid-containing polymer is a copolymer of methacrylic acid and maleic anhydride.

30. Method according to claim 25, wherein said nonionic surfactant has the following structure:

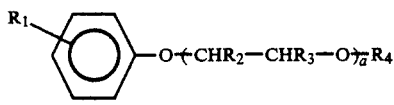

wherein $R_1$ is a straight or branched chain alkyl group having from about 4 to about 20 carbon atoms; $R_2$ and $R_3$ are independently hydrogen or methyl; $R_4$ is hydrogen, alkyl, aryl, or aralkyl, the alkyl portion being straight or branched chain having from about 1 to and about 20 carbon atoms, and the aryl portion being substituted benzene or naphthalene; and a is from about 0 to about 50.

31. Method according to claim 25, wherein said phosphate-generating compound is an inorganic phosphate salt.

32. Method according to claim 2, wherein the weight ratio of methacrylic acid-containing polymer to nonionic surfactant introduced into said aqueous system is about 10:1 to about 1:10.

33. Method according to claim 25, wherein the weight ratio of methacrylic acid-containing polymer to nonionic surfactant introduced into said aqueous system is about 1:1 to about 10:1.

34. method according to claim 25, wherein the weight ratio of methacrylic acid-containing polymer to nonionic surfactant introduced into said aqueous system is about 5:1.

* * * * *